(12) United States Patent
Biskeborn

(10) Patent No.: US 6,760,177 B2
(45) Date of Patent: Jul. 6, 2004

(54) SIGNAL-BASED TAPE WRAP ANGLE SETTING FOR FLAT CONTOUR LINEAR TAPE RECORDING HEADS

(75) Inventor: Robert Glenn Biskeborn, Holister, CA (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 09/938,627

(22) Filed: Aug. 23, 2001

(65) Prior Publication Data

US 2003/0039045 A1 Feb. 27, 2003

(51) Int. Cl.[7] .......................... G11B 15/18; G11B 15/60
(52) U.S. Cl. ....................... 360/71; 360/90; 360/130.21
(58) Field of Search ....................... 360/71, 90, 130.21, 360/130.31

(56) References Cited

U.S. PATENT DOCUMENTS

| | | | |
|---|---|---|---|
| 5,508,865 A | | 4/1996 | La Garcia et al. .......... 360/109 |
| 5,748,396 A | * | 5/1998 | Milo ........................... 360/31 |
| 5,905,613 A | * | 5/1999 | Biskeborn et al. ..... 360/130.21 |
| 6,424,496 B1 | * | 7/2002 | Kaiser et al. ............ 360/241.1 |
| 6,700,733 B1 | * | 3/2004 | Biskeborn .................... 360/90 |

FOREIGN PATENT DOCUMENTS

SU   621019   4/1977

OTHER PUBLICATIONS

Biskeborn et al, Jul. 2003, IBM J. RES. & DEV., vol. 47, No. 4, pp. 385–400.*

* cited by examiner

Primary Examiner—David Hudspeth
Assistant Examiner—Dan I. Davidson
(74) Attorney, Agent, or Firm—Robert O. Guillot; IPLO Intellectual Property Law Offices

(57) ABSTRACT

In an essentially flat contour linear tape recording head, a nominal tape wrap angle exists at which reading signals from the magnetic tape ceases and/or commences. This nominal tape wrap angle can be easily determined by monitoring a prerecorded signal, such as the servo track signal, while the tape wrap angle is adjusted. When the signal ceases (or starts, depending upon the direction of adjustment) an initial position of the tape movement control device relative to the tape wrap angle is identified. At this initial position it is known that the tape wrap angle is at its nominal value, such as approximately 0.1°. Thereafter, the tape movement control device can be knowingly adjusted with a calibrated indicator to accurately and quickly achieve a desired final tape wrap angles.

13 Claims, 2 Drawing Sheets

SIGNAL-BASED TAPE WRAP ANGLE SETTING FOR FLAT CONTOUR LINEAR TAPE RECORDING HEADS

BACKGROUND OF THE INVENTION

1. Field of the Invention

The present invention relates generally to devices and methods for setting the tape wrap angle for essentially flat contour tape recording heads, and more particularly to a device and method which utilizes a signal from the tape to provide an initial point for setting the tape wrap angle.

2. Description of the Prior Art

Magnetic tape drives operate by the passage of magnetic tape across a tape recording head which includes a plurality of tape writing elements and tape reading elements. A typical tape drive includes an actuator means for moving the tape head laterally relative to the longitudinal axis of the tape, such that the tape head reading and writing elements may access different data tracks on the magnetic tape, and a typical magnetic tape may have hundreds of data tracks written on it. A typical magnetic tape also includes a plurality of servo tracks that are written onto the tape during manufacturing, and which are used by the tape drive for tape head alignment and control purposes.

For efficient writing and reading of data to and from a magnetic tape, it is necessary that the tape make direct physical contact with the data writing elements and data reading elements of the tape head. Typical prior art tape heads have been fabricated with a convex curve contour head surface, with the write and read sensors generally centrally disposed in the curved surface. A tension force is placed upon the tape, such that it is pulled tightly enough across the curved head surface to make contact with the read and write sensors of the head. The tension force and the movement of the tape across the head surface can create significant tribological effects that can degrade the performance of magnetic tape drives having such curved tape heads and unwanted wear on the magnetic tape. Additionally, the fabrication of such curved tape heads can be relatively difficult and expensive.

In an effort to improve upon the curved surface tape heads, flat contour tape heads have been developed. Such flat contour heads are simpler and generally less expensive to fabricate. However, it can be more difficult to obtain contact between the magnetic tape and the read and write sensor elements where the tape head surface is flat. It has been found and described in the prior art, that when the magnetic tape is directed towards the planar flat surface of the tape head at a slight angle, termed the tape wrap angle, that an air pressure differential can be created, such that the magnetic tape is pressed against the flat tape head surface by the air pressure differential. When the tape wrap angle is properly selected, harmful tribological effects and magnetic tape wear are minimized, while significant data read and write functions are achieved due to the contact of the magnetic tape with the read and write elements of the flat contour tape head.

It is therefore important in such prior art flat contour tape heads that the tape wrap angle be easily and accurately set. In the prior art, the method for setting the tape wrap angle involves the utilization of precise mechanical tools and measurements, and the method for setting the tape wrap angle was therefore cumbersome and time intensive, and was not always consistently, accurately repeatable. As is described hereinbelow, the present invention is a quick, easy and therefore less expensive method for setting the tape wrap angle, which utilizes the electronic signal generated by prewritten data tracks, such as the servo tracks, of the magnetic tape to accurately determine an initial point for setting the tape wrap angle. The accurate setting of a desired tape wrap angle from the initial point is then easily accomplished.

SUMMARY OF THE INVENTION

The present invention is a method for setting the tape wrap angle for a flat, or nearly flat, contour linear tape recording head of a magnetic tape drive. At the final stages of the tape drive manufacturing process, the tape drive includes a tape read/write head, a magnetic tape within a tape cartridge and a take-up reel. Such magnetic tapes generally include a plurality of servo tracks that are provided by the manufacturer on the tape for purposes such as tape head alignment and movement control. To facilitate the setting of the tape wrap angle of such tape drives, an adjustable tape movement control device is located proximate each side of the tape head, and the tape movement control device is operable to move the tape relative to the flat planar surface of the tape head to adjust the tape wrap angle.

The present invention utilizes the effect that a precise and repeatable nominal tape wrap angle exists at which reading signals from the magnetic tape ceases and/or commences. Specifically, where the tape wrap angle is greater than the nominal value, such as 0.1°, the read signal from the magnetic tape will be strong, whereas when the tape wrap angle is less than the nominal approximately 0.1° value the read signal from the tape ceases. Thus, the nominal tape wrap angle can be easily determined by monitoring the servo track signal, or other prewritten data track signals (or even a native tape signal), while the tape wrap angle is adjusted. When the tape read signal ceases (or starts, depending upon the direction of adjustment) an initial position of the tape movement control device relative to the tape wrap angle is identified. At this initial position it is known that the tape wrap angle is at its nominal value, such as approximately 0.1°. Thereafter, the tape movement control device can be knowingly adjusted with a calibrated indicator to accurately and quickly achieve a desired final tape wrap angle.

It is an advantage of the method for setting the tape wrap angle for an essentially flat contour tape recording head of the present invention that it utilizes an electronic signal from the magnetic tape to determine a nominal tape wrap angle which is utilizable as an initial point for setting the desired tape wrap angle.

It is another advantage of the method for setting the tape wrap angle of the present invention that the tape wrap angle can be accurately and repeatably set.

It is a further advantage of the method for setting the tape wrap angle of the present invention that the tape wrap angle can be rapidly and inexpensively set.

It is yet another advantage of the method for setting the tape wrap angle of the present invention that magnetic tape drives can be more reliably and inexpensively manufactured.

These and other features and advantages of the present invention will no doubt become apparent to those skilled in the art upon reading the following detailed description which makes reference to the several figures of the drawings.

IN THE DRAWINGS

DETAILED DESCRIPTION OF THE PREFERRED EMBODIMENTS

Figure 1:
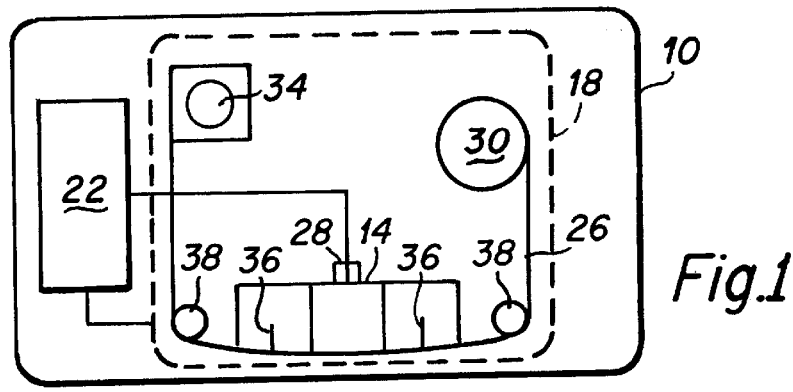
FIG. 1 is a generalized depiction of a magnetic tape drive, including a flat contour linear tape recording head.

FIG. 1 is a top plan view that generally depicts a magnetic tape drive 10 having a flat contour linear tape recording head 14 which provides a general background for the present invention. As depicted in FIG. 1, the magnetic tape drive 10 generally includes at least one magnetic tape recording device 18 with a control unit 22 for controlling the motion of various components of the magnetic tape recording device 18 and for managing the data that is written to or read from the magnetic tape 26 within the magnetic tape recording device. The magnetic tape recording device 18 generally includes the flat contour magnetic tape recording head 14 mounted upon an actuator 28, a tape supply reel 30 and a tape take-up reel 34 for transporting the magnetic tape 26 across the head. The head 14 includes a sensor element strip 36 that includes a plurality of sensor elements (described herebelow) that function to write data to and read data from the magnetic tape 26. The tape recording device 18 further includes adjustable tape movement control devices 38 for setting the tape wrap angle at which the tape approaches the head 14. In the tape drive depicted in FIG. 1, and as is described in greater detail herebelow, two adjustable guides, such as rollers, are utilized as such a tape movement control devices 38 to set the tape wrap angle. However, the present invention is intended to generally include various other devices as may be known to those skilled in the art for adjustably setting the tape wrap angle, such that the present invention is not to be limited to tape drives that include such adjustable rollers for setting the tape wrap angle, as will become apparent upon further reading this detailed description.

Generally, as is well known to those skilled in the art, for tape recording heads to function properly, it is necessary that the moving recording tape make contact with the sensor element strip 36 of the tape recording head 14. Even a relatively small gap between the tape and the sensor element strip can result in a diminished signal being received by the head. Where prior art curved recording heads are utilized, a certain degree of tension on the recording tape assists in achieving contact with the sensor elements of the head, however flat contour tape heads require a more sophisticated mechanism to assure that contact between the tape and the sensor element strip is obtained.

Figure 2:
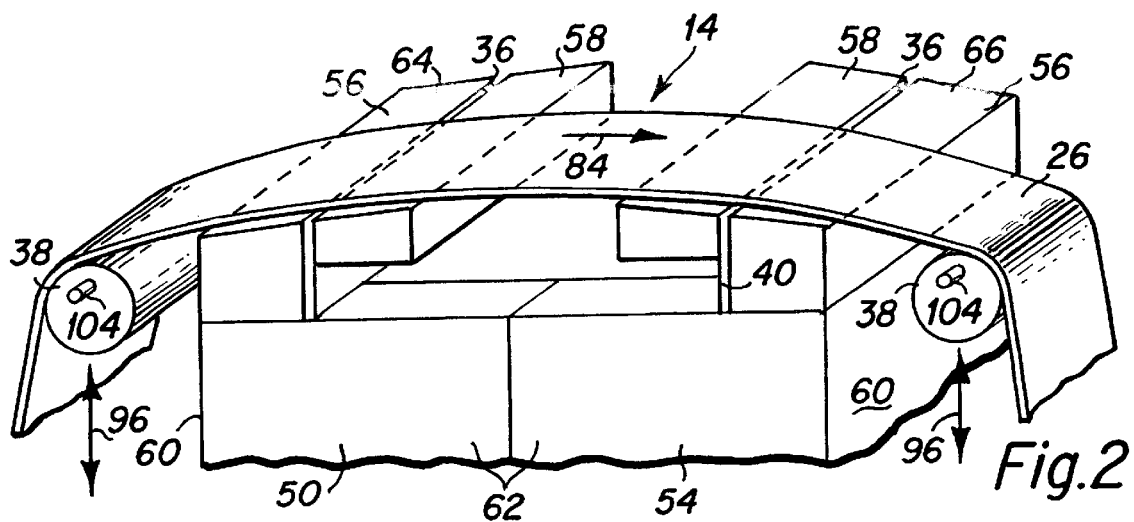
FIG. 2 is a perspective view of a flat contour linear tape recording head depicted in FIG. 1.
Figure 3:
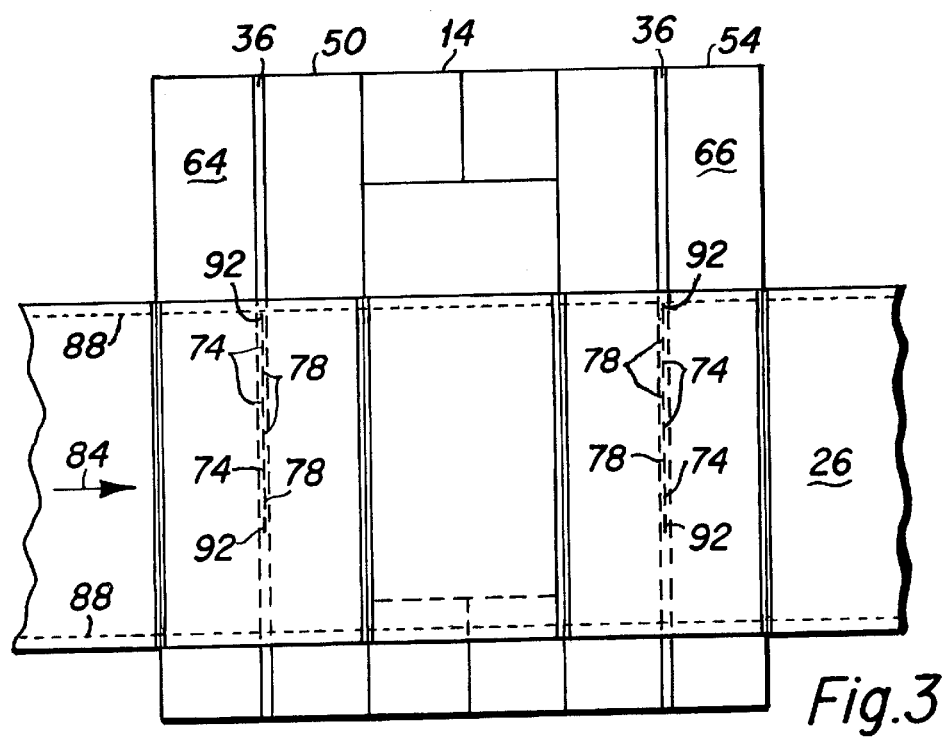
FIG. 3 is a top plan view of the flat contour linear tape recording head depicted in FIG. 2.
Figure 4:
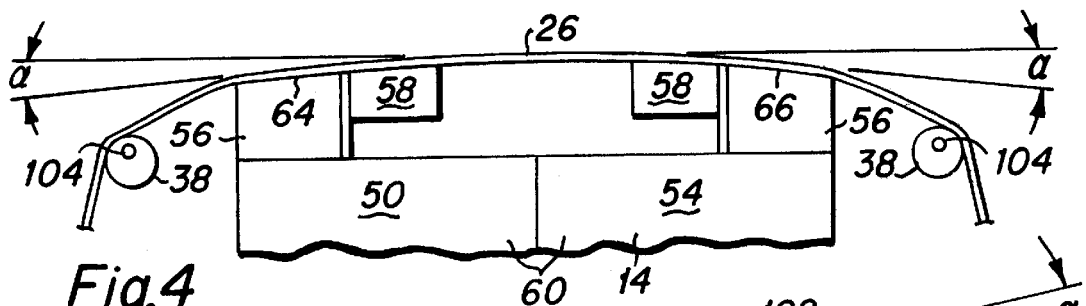
FIG. 4 is a side elevational view of the recording head depicted in FIG. 2.

FIG. 2 is a perspective view of a flat contour linear tape recording head 14 having a recording tape 26 disposed thereon, FIG. 3 is a top plan view of the recording head 14 depicted in FIG. 2, and FIG. 4 is a front elevational view of the recording head depicted in FIG. 2. As depicted in FIGS. 2, 3 and 4, the essentially flat contour linear tape recording head includes a left sensor block element 50 and a right sensor block element 54. Each sensor block 50 and 54 includes a wafer substrate portion 56 having a sensor element strip 36 formed thereon, a cover piece 58 that is bonded to the upper portion of the sensor strip 36 to cover it, and a lower U-shaped base 60 having projecting ends 62. The ends 62 of the base pieces 60 are bonded together utilizing an appropriate adhesive. As is best seen in FIG. 4, the top surface 64 of the left sensor block element 50 is flat and the top surface 66 of the right sensor block element 54 is flat; however, the surfaces 64 and 66 are not coplanar. Rather, a particular angle $\alpha$, is fabricated between the surfaces 64 and 66 and a common surface therebetween represented by the tape 26. The angle $\alpha$ is approximately equal to the desired tape wrap angle, and it is particularly important in determining the performance characteristics of the tape head 14, as is more fully discussed herebelow.

As is best seen in FIG. 3, a plurality of discrete sensor elements 74 and 78 are fabricated in the sensor element strip 36 in the top surface 64 and 66 of each of the left block 50 and right block 54, respectively. The discrete sensor elements 74 and 78 are formed as read head elements 74 and write head elements 78 that are preferably fabricated in alternating manner within the linear sensor strip 36. Furthermore, the sensor elements 74 and 78 are oppositely disposed with regard to the left sensor block 50 and right sensor block 54. Therefore, when the tape 26 is moving toward the right (see arrow 84), a write element 78 in the left block 50 can write data onto the tape 26 and a read element 74 in right block 54 can subsequently read the data written by the write element 78. For tape head alignment purposes, magnetic recording tape is manufactured typically with at least one, and more often with a plurality of servo tracks 88 that are written onto otherwise blank tape with gaps between the servo tracks in which data tracks are written. Servo track reading elements 92 are fabricated within the sensor strips 36 of the left and right blocks 50 and 54 to read the servo tracks 88, and provide servo track signals that are utilized for tape head control.

As is mentioned above and best seen in FIGS. 2 and 4, the present invention includes an adjustable tape wrap angle setting guide that is preferably a roller 38 that is disposed on each side of the tape head 14. The tape 26 passes over the roller 38 prior to its passage across the tape head, and the roller is adjustable (see arrow 96) such that the tape wrap angle can likewise be adjusted, as is next described in detail with the aid of FIG. 5.

Figure 5:
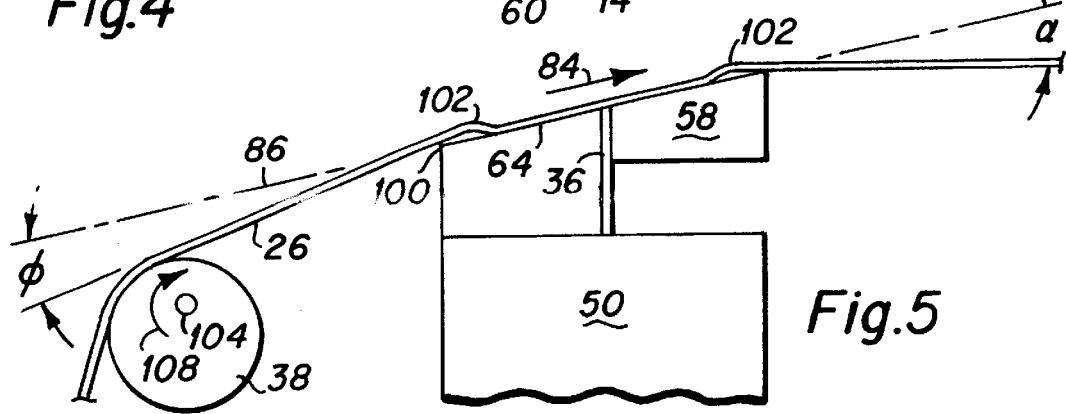
FIG. 5 is an enlarged side elevational view depicting the tape wrap angle of the recording head depicted in FIG. 2.

FIG. 5 is an enlarged side elevational view of the left sensor block 50 which will facilitate a discussion of the tape wrap angle. As depicted in FIG. 5, with the tape moving towards the right (see arrow 84) the plane of the tape is adjustably set to a small tape wrap angle $\Phi$ with respect to the plane 86 of the flat upper surface 64 of the block 50. The edge 100 of the block 50 is the apex of the wrap angle $\Phi$. If the angle $\Phi$ is set at approximately 0°, a thin film of air will be drawn between the moving tape 26 and the flat surface 64, and little or no signal will be detectable by the sensor elements 74 and 92 of the tape head. When the tape wrap angle $\Phi$ is increased even a small amount, such as approximately 0.1°, the edge 100 serves to disrupt and prevent the thin air film from entering between the tape 26 and the flat surface 64. Then, due to an air pressure differential above and below the tape, air pressure above the tape presses the tape generally into contact with the flat surface 64 and with the sensor elements 74, 78 and 92, such that proper read and write functions are performed by the tape head and the tape. A small bump 102 is created in the tape due to its bending stiffness proximate the edge 100 of the flat surface and a symmetrical tape bump 102 is likewise formed at the right side edge of the block 50. Significantly, it has been determined by the inventor that for typical magnetic tape, such as tape corresponding to the linear tape open (LTO) industry standard, a nominal tape wrap angle Φ of at least approximately 0.1° is required to obtain a desired signal strength from the tape, and that a tape wrap angle Φ of less than approximately 0.1° will generally produce little or no signal. Also, where the tape wrap angle Φ exceeds approximately 5°, tribological, tape wear and other effects become significant in degrading the performance of the head. In the flat contour linear tape recording head of the present invention, as depicted in FIGS. 1–5, a preferred final tape wrap angle (Φ=α) is approximately 1.8°. The tape wrap angle Φ is therefore a significant parameter in the proper operation of the flat contour linear tape recording head system, and a variation in the tape wrap angle of even 1° can adversely affect the operation of the tape head. It is to be understood that the essentially flat contour linear tape recording head described hereabove, as well as the significance of the tape wrap angle to the proper performance of the flat contour tape recording head, are well known by those skilled in the art.

The present invention is a rapid and accurate method for setting the tape wrap angle, as is next discussed. The tape wrap angle setting method of the present invention utilizes the feature mentioned above that a nominal tape wrap angle exists that provides a cut-off for reading a signal from the tape. As identified above, where the tape wrap angle for LTO magnetic tape is less than approximately 0.1° practically no signal is detectable from the tape. This is due to the thin air film that will separate the tape from the sensor elements when the tape wrap angle is less than the nominal value of approximately 0.1°. Correspondingly, where the tape wrap angle is greater than the nominal angle of approximately 0.1°, the thin air film is removed and the tape is pressed by air pressure into contact with the tape head sensors, such that a desirably strong signal is read from the tape. The tape wrap angle setting method of the present invention takes advantage of this nominal angle, and specifically that the nominal angle is approximately 0.1° for the tape head and LTO magnetic tape.

As depicted in FIG. 5, it is to be understood that the magnetic tape is disposed within the tape drive, and a read sensor signal is monitored, such as servo track sensor 92 that detects the servo track signal on the tape. With the tape moving towards the right (see arrow 84), in a preferred method the left side adjustable roller 38 is set in a first position with a tape wrap angle of a few degrees, such as 3–4°. At this tape wrap angle a signal will be detected from the servo track sensor 92 as the tape will be properly positioned in contact with the sensor elements. Thereafter, the adjustable roller 38 is actuated upwardly, such that the tape wrap angle is gradually reduced, and the servo track signal is monitored during this process. When the tape movement control device reaches a particular point, termed the initial position herein, the tape wrap angle is reduced to the nominal angle, and the servo track signal will suddenly cease, because an air film becomes created under the tape when the tape wrap angle reaches the nominal value. Thus, by monitoring the servo track signal it becomes possible to determine when the tape wrap angle has reached the nominal angle. As indicated above, for standard LTO tape the nominal angle is approximately 0.1°. It is to be understood that this step of determining the nominal angle by monitoring the servo track signal is most significant, in that it provides a benchmark or initial position for subsequently setting the tape wrap angle to a desired value. That is, once it is determined that the tape movement control device 38 is at the initial position (the signal has ceased), it is likewise known that the tape wrap angle of approximately 0.1° has been reached, and it is then possible to readjust the tape wrap angle utilizing a calibrated tape movement control mechanism to a desired second position, such that the resulting final tape wrap angle Φ will be the desired preselected value, such as approximately 1.8°.

Various calibrated mechanical systems can be implemented for the calibrated, controlled movement of the tape. In one such mechanical system the tape roller 38 is mounted upon an eccentric axle 104, such that rotation 108 of the eccentric axle causes the desired displacement of the roller. The excentric axle is engaged with a calibration device, such that rotation of the eccentric axle through a known number of degrees will result in a known displacement of the roller, such that a change in the tape wrap angle from the initial angle of 0.1° to the desired final tape wrap angle of approximately 1.8° is easily accomplished. A detailed description of such a calibrated eccentric axle roller mounting for setting the tape wrap angle is provided in the copending U.S. patent application Ser. No. 09/591,696, filed Jun. 9, 2000, entitled Tape System With Adjustable Wrap Angles and Method for Adjusting Tape Wrap Angle, by inventor Robert Biskeborn, the inventor hereof, and the disclosure of that patent application is incorporated herein at this point as though set forth in full.

It is therefore to be understood that the significance of properly setting the tape wrap angle for essentially flat contour linear tape recording heads is well known in the prior art. However, it has heretofore proved to be relatively difficult to set the tape wrap angle accurately, and as indicated hereabove, a variation of even 1° can significantly affect the flat contour tape head performance. By utilizing the signal from the servo track, as is preferred in the present invention, the initial position of the calibrated tape movement control device that corresponds to the nominal angle of approximately 0.1° can be rapidly, easily and accurately determined. Once this benchmark initial position has been determined by monitoring the servo track signal, the tape movement control device (the roller or guide) can be mechanically adjusted, such as by using the calibrated eccentric axle, to a second position that achieves a desired final tape wrap angle.

In an alternative embodiment the nominal tape wrap angle can be located by starting the tape adjustment process from a first position which is less than the nominal tape wrap angle, such as an initial position of approximately 0°. As the servo signal is monitored in this embodiment, there will be no servo signal until the tape wrap angle reaches its nominal value, at which angle the thin air film beneath the tape is removed, and a servo track signal commences. Once the initial position related to the nominal tape wrap angle has been determined, the tape movement control mechanism can be further adjusted in the calibrated manner described above, to a second position which corresponds to the desired final tape wrap angle. This alternative embodiment is thought by the inventor to be not as desirable as the first preferred embodiment describe hereabove, in that it can take some time for the air film to completely bleed from beneath the tape, such that the initial point corresponding to the nominal angle at which the servo signal commences can be more difficult to accurately and rapidly determine.

The present invention can be used for any tape drive having adjustable tape wrap angle capability and communications port access and control but is particularly suited to LTO (Linear Tape Open) drives, which use a Timing Based Servo.

Figure 6:
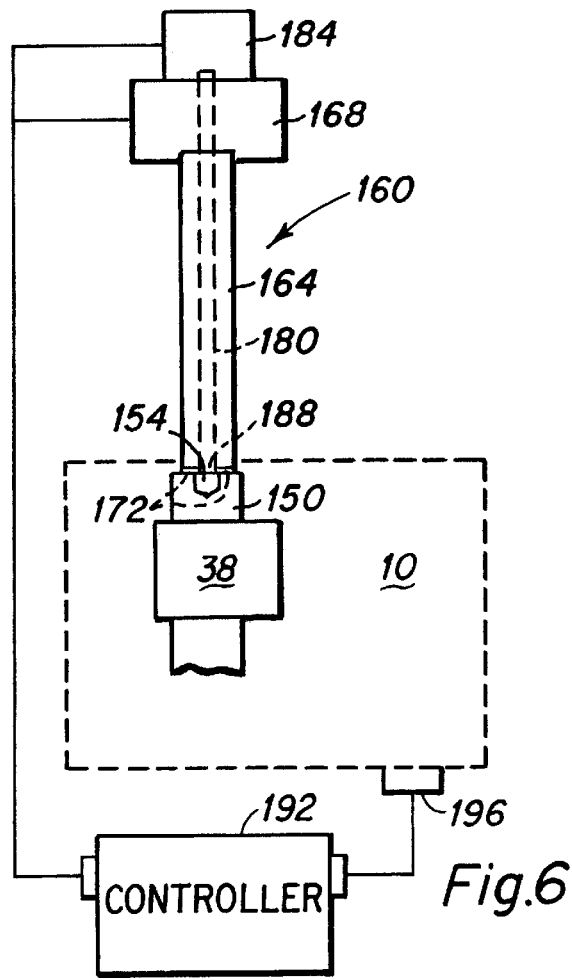
FIG. 6 is a diagrammatic depiction of an automated tape wrap angle setting system.

The present invention includes a system that automates the process of setting the tape wrap angle for a flat, or nearly flat, contour linear tape recording head of a magnetic tape drive 10. As depicted in FIG. 6, a system for accomplishing the automated setting of the tape wrap angle of such tape drives 10 may include adjustable eccentric rollers 38 having a rotatable outer eccentric shaft 150 and a concentric locking screw 154. An actuator 160 for controlling the movement of the eccentric roller 38 includes an outer hollow tube 164 that is engaged at one end to an outer tube motor 168, and which has eccentric roller engagement teeth 172 at the other end, an inner shaft 180 concentrically disposed within the outer tube 164 and having an inner shaft motor 184 engaged at one end and a screw drive head 188 at the other end for engagement with the locking screw 154 of the eccentric roller. The system further includes a computerized controller 192 with access to a tape drive communications port 196, and which controls the outer tube motor 168 and inner shaft motor 184, and which operatively accomplishes the tape wrap angle setting algorithm for accomplishing the adjustment of the tape wrap angle as is described above.

In operation communication between the controller 192 and the tape drive 10 is established, preferably via either a serial or scsi port. The controller 192 then commands the drive 10 to load tape and start. The controller for an LTO (Linear Tape Open) standard drive then monitors the LPOS signal from the timing base servo tracks of the tape. The algorithm then defines that the left eccentric roller is adjusted as follows: With the tape moving outbound (from cartridge to take up reel), the LPOS signal is detected on the left module 50. This is not the normal tape drive operation in the sense that normally an opposite gap servo operation is performed, in which during outbound tape motion, the servos on the right module 54 are used for positioning the head; however, in this tape wrap angle setting method adjustment the servos on the left module are used. The controller 192 causes the actuator 160 to engage the eccentric roller 38; the inner motor 184 unlocks the locking screw 154; the outer motor 168 then rotates the eccentric roller shaft 150 in a predetermined direction (usually counterclockwise for the left roller) until the LPOS signal vanishes. When the signal vanishes the tape wrap angle is at its nominal value and the roller is now in the initial position, as are described above. The control system records the position of the roller at which this event occurred and then repeats the process. If the initial position on the second try is within a predefined tolerance of the first reading, the measurement stage is completed. If not, another measurement is performed, etc., until consistency is achieved. Then the controller computes the required roller setting to achieve the desired tape wrap angle and commands the outer motor 168 of the actuator 160 to position the roller shaft 150, and then commands the inner motor 184 to tighten the locking screw 172. This process is repeated with the appropriate change in sense for the right hand roller.

The design of this actuator mechanism for the IBM LTO drive is such that all access is from the top of the drive, thus enhancing ease of implementing this procedure in manufacturing. The drive does not have to be disassembled to accomplish this. The procedure is fully automated so user intervention and operator errors are circumvented This procedure is carried out after the head skew and other head adjustments are performed, as these can interact with tape wrap angle.

While the present invention has been shown and described with regard to a preferred embodiment, it is to be understood that those skilled in the art will no doubt devise certain modifications and alterations in form and detail thereto that nevertheless include the true spirit and scope of the present invention. It is therefore intended by the inventors that the following claims cover all such alterations and modifications that nevertheless include the true spirit and scope of the invention.

I claim:

1. A method for setting the tape wrap angle of a flat contour linear tape recording head, comprising the steps of:
   adjusting a tape movement control device to move a magnetic tape from a first position to an initial position relative to a flat upper surface of the tape recording head that corresponds to a nominal tape wrap angle;
   determining said initial position by monitoring a signal from said tape; and
   adjusting said calibrated tape movement control device to move said tape from said initial position to a second position that corresponds to a desired tape wrap angle.

2. A method for setting the tape wrap angle as described in claim 1 wherein said nominal tape wrap angle corresponds to a tape position in which said signal ceases.

3. A method for setting the tape wrap angle as described in claim 2, wherein said tape movement control device is set in said first position wherein the tape wrap angle of said tape is greater than said nominal tape wrap angle.

4. A method for setting the tape wrap angle as described in claim 3 wherein said tape movement control device is adjusted from said first position in a manner that reduces the tape wrap angle of said tape, and said signal is monitored while said tape movement control device is adjusted.

5. A method for setting the tape wrap angle as described in claim 4 wherein said tape movement control device is adjusted to increase the tape wrap angle from said initial position to said second position.

6. A method for setting the tape wrap angle as described in claim 5 wherein said signal is a servo track signal.

7. A method for setting the tape wrap angle as described in claim 6 wherein said tape movement control device is a tape roller that is mounted on a calibrated movable excentric axle.

8. A method for setting the tape wrap angle as described in claim 1, wherein said step of monitoring said signal includes the step of determining when said signal commences.

9. A method for setting the tape wrap angle as described in claim 8, wherein said tape movement control device is set in said first position wherein the tape wrap angle of said tape is less than said nominal tape wrap angle.

10. A method for setting the tape wrap angle as described in claim 9 wherein said tape movement control device is adjusted from said first position in a manner that increases the tape wrap angle of said tape, and said signal is monitored while said tape movement control device is adjusted.

11. A method for setting the tape wrap angle as described in claim 10 wherein said tape movement control device is adjusted to increase the tape wrap angle from said initial position to said second position.

12. A method for setting the tape wrap angle as described in claim 11 wherein said signal is a servo track signal.

13. A method for setting the tape wrap angle as described in claim 12 wherein said tape movement control device is a tape roller that is mounted on a calibrated movable excentric axle.

* * * * *